United States Patent
Todoroff et al.

(10) Patent No.: US 7,248,345 B2
(45) Date of Patent: Jul. 24, 2007

(54) SIGNAL PROCESSING METHOD FOR USE WITH AN OPTICAL NAVIGATION SYSTEM

(75) Inventors: Brian D. Todoroff, San Jose, CA (US); Yansun Xu, Mountain View, CA (US)

(73) Assignee: Silicon Light Machines Corporation, San Jose, CA (US)

( * ) Notice: Subject to any disclaimer, the term of this patent is extended or adjusted under 35 U.S.C. 154(b) by 101 days.

(21) Appl. No.: 11/268,898

(22) Filed: Nov. 8, 2005

(65) Prior Publication Data

US 2006/0106319 A1 May 18, 2006

Related U.S. Application Data

(60) Provisional application No. 60/627,225, filed on Nov. 12, 2004.

(51) Int. Cl.
*G01P 3/36* (2006.01)
*G09G 5/08* (2006.01)

(52) U.S. Cl. ............................ 356/28; 356/29; 345/166

(58) Field of Classification Search .................. 356/28, 356/29; 345/166, 156–163; 382/313–319
See application file for complete search history.

(56) References Cited

U.S. PATENT DOCUMENTS

| | | |
|---|---|---|
| 3,922,093 A | 11/1975 | Dandliker et al. |
| 4,546,347 A | 10/1985 | Kirsch |
| 4,799,055 A | 1/1989 | Nestler et al. |
| 5,288,993 A | 2/1994 | Bidiville et al. |
| 5,473,344 A | 12/1995 | Bacon et al. |
| 5,578,813 A | 11/1996 | Allen et al. |
| 5,644,139 A | 7/1997 | Allen et al. |
| 5,703,356 A | 12/1997 | Bidiville et al. |
| 5,729,008 A | 3/1998 | Blalock et al. |
| 5,729,009 A | 3/1998 | Dandliker et al. |
| 5,786,804 A | 7/1998 | Gordon |
| 5,825,044 A | 10/1998 | Allen et al. |
| 5,854,482 A | 12/1998 | Bidiville et al. |
| 5,907,152 A | 5/1999 | Dandliker et al. |
| 5,963,197 A | 10/1999 | Bacon et al. |
| 5,994,710 A | 11/1999 | Knee et al. |
| 6,031,218 A | 2/2000 | Piot et al. |
| 6,037,643 A | 3/2000 | Knee |

(Continued)

*Primary Examiner*—Thomas H. Tarcza
*Assistant Examiner*—Isam Alsomiri
(74) *Attorney, Agent, or Firm*—William E. Nuttle

(57) ABSTRACT

A signal processor and method are provided for detecting movement of a surface relative to an optical sensor having an array of photosensitive elements. Generally, the method involves: (i) sampling each of a number (M) of phase signals from the photosensitive elements, each of the M signals having a magnitude ($A_i$) and including a tracking signal at a frequency being tracked and a background signal at other frequencies that offsets the tracking signal, where i, an index of the signals, is a whole number between 0 and M-1; (ii) eliminating the offset to the tracking signal due to the background signal to generate M non-offset phase signals having a magnitude ($A'_i$); (iii) adjusting phase angles ($\theta_i$) of the non-offset phase signals to generate M weighted phase signals ($A'_i\theta'_i$); and (iv) combining each of the M weighted phase signals ($A'_i\theta'_i$) to generate an average weighted phase having a phase angle ($\theta$), that when tracked over time indicates a direction and velocity of the movement of an image of the surface mapped to the array.

14 Claims, 10 Drawing Sheets

U.S. PATENT DOCUMENTS

| | | |
|---|---|---|
| 6,057,540 A | 5/2000 | Gordon et al. |
| 6,097,371 A | 8/2000 | Siddiqui et al. |
| 6,151,015 A | 11/2000 | Badyal et al. |
| 6,172,354 B1 | 1/2001 | Adan et al. |
| 6,225,617 B1 | 5/2001 | Dandliker et al. |
| 6,233,368 B1 | 5/2001 | Badyal et al. |
| 6,281,881 B1 | 8/2001 | Siddiqui et al. |
| 6,281,882 B1 | 8/2001 | Gordon et al. |
| 6,326,950 B1 | 12/2001 | Liu |
| 6,330,057 B1 | 12/2001 | Lederer et al. |
| 6,351,257 B1 | 2/2002 | Liu |
| 6,396,479 B2 | 5/2002 | Gordon |
| 6,421,045 B1 | 7/2002 | Venkat et al. |
| 6,424,407 B1 | 7/2002 | Kinrot et al. |
| 6,433,780 B1 | 8/2002 | Gordon et al. |
| 6,452,683 B1 | 9/2002 | Kinrot et al. |
| 6,455,840 B1 | 9/2002 | Oliver et al. |
| 6,462,330 B1 | 10/2002 | Venkat et al. |
| 6,476,970 B1 | 11/2002 | Smith |
| 6,529,184 B1 | 3/2003 | Julienne |
| 6,585,158 B2 | 7/2003 | Norskog |
| 6,603,111 B2 | 8/2003 | Dietz et al. |
| 6,608,585 B2 * | 8/2003 | Benitz ............... 342/25 R |
| 6,621,483 B2 | 9/2003 | Wallace et al. |
| 6,657,184 B2 | 12/2003 | Anderson et al. |
| 6,664,948 B2 | 12/2003 | Crane et al. |
| 6,674,475 B1 | 1/2004 | Anderson |
| 6,677,929 B2 | 1/2004 | Gordon et al. |
| 6,703,599 B1 | 3/2004 | Casebolt et al. |
| 6,737,636 B2 | 5/2004 | Dietz et al. |
| 6,774,351 B2 | 8/2004 | Black |
| 6,774,915 B2 | 8/2004 | Rensberger |
| 6,795,056 B2 | 9/2004 | Norskog et al. |
| 6,809,723 B2 | 10/2004 | Davis |
| 6,819,314 B2 | 11/2004 | Black |
| 6,823,077 B2 | 11/2004 | Dietz et al. |
| 7,119,323 B1 * | 10/2006 | Brosnan et al. ............ 250/221 |
| 2003/0071750 A1 * | 4/2003 | Benitz ................... 342/25 |

* cited by examiner

SIGNAL PROCESSING METHOD FOR USE WITH AN OPTICAL NAVIGATION SYSTEM

CROSS-REFERENCE TO RELATED APPLICATIONS

The present application claims the benefit of priority under 35 U.S.C. 119(e) to U.S. Provisional Patent Application Ser. No. 60/627,225, filed on Nov. 12, 2004 entitled A Method for Determining Motion Without Sinusoidal Signals; which application is hereby incorporated by reference.

TECHNICAL FIELD

The present invention relates generally to signal processing, and more particularly to a signal processing circuit and method for use with an optical navigation system for determining movement of an optical sensor relative to a surface without the use of sinusoidal signals.

BACKGROUND OF THE INVENTION

Signal processors are used in a wide range of applications including, for example, measuring a current output from a photo-detector of an array in an optical navigation system. Optical navigation systems, such as an optical computer mouse or trackball, are well known for inputting data into and interfacing with personal computers and workstations. Such devices allow rapid relocation of a cursor on a monitor, and are useful in many text, database and graphical programs. A user controls the cursor, for example, by moving the mouse over a surface to move the cursor in a direction and over distance proportional to the movement of the mouse. Alternatively, movement of the hand over a stationary device may be used for the same purpose.

The dominant technology used today for optical mice relies on a light source illuminating a surface, a two-dimensional (2D) array of photosensitive elements to capture the resultant images, and a signal processor that correlates successive images to detect and quantify the motion of the mouse. The image can be produced in a number of ways including illuminating the surface at or near grazing incidence to produce and image shadows due to roughness of the surface, illumination with a coherent light source to produce a speckle image of the surface, or the use of a pattern printed onto the surface itself. Regardless of the imaging method used to produce a trackable image, a processor captures the image and does a series of correlations between successive images to determine the most likely motion between frames. A similar method can be used with a linear sensor to track one dimension (1D) motion. In either case, the correlation used to track the motion of the image requires a great deal of processing and results in an unsatisfactory power consumption that limits the usefulness of the technique in power sensitive applications, such as wireless mice.

An alternative method to correlation uses a linear or 1D array of photosensitive elements or detectors, such as photodiodes, in which the output of the individual elements in the array are combined or wired together in a repeating pattern spanning two or more detectors to track motion along one axis or in one dimension. Generally, the detectors are wired together in a pattern spanning from about four (4) to about (10) elements, a number referred to here as the M value of the array. This results in M discrete outputs from the array. An example of such an array with an M value of 4 is shown in FIG. 1.

Referring to FIG. 1, the array, shown is a 1D comb-array 102 of photosensitive elements 104 directly wired in groups to detect of motion through movement of a light-dark pattern known as speckle. Speckle is the complex interference pattern generated by scattering of coherent light off of an optically rough surface and detected by a photosensitive element, such as a photodiode, with a finite angular field-of-view or numerical aperture. The image mapped to or captured on the 1D comb-array may be magnified or demagnified to achieve matching and so that the distribution of spatial frequencies in the image is roughly centered around the spatial frequencies of the array. Through use of signal processing, it is possible to track the movement of this image as it moves back and forth across the 1D comb-array and from that tracking derive the motion of the surface relative to the including the 1D comb-array along the long axis of the array. Current processing techniques require that the 1D comb-array outputs be weighted with coefficients derived from sine and cosine waves, combined together, and processed to produce two quasi-sinusoidal outputs representing separate in-phase and quadrature signals. These signals are then used to track motion.

Although a significant improvement over prior art, these speckle-based devices have not been wholly satisfactory for a number of reasons. In particular, optical navigation systems using the above 1D comb-array have not demonstrated the accuracy demanded in state-of-the-art pointing devices today, which generally must have a path error of less than 0.5%. Furthermore, the above approach involves processing signals from multiple signal processing paths, and suffers from relatively complex signal processing requirements.

Another problem with the above speckle-based devices is their limited accuracy along directions that deviate significantly from orientations the 1D array. This is especially a problem where the optical mouse is moved in an off-axis direction causing the speckle pattern or image to enter and leave the field of view of the 1D array too quickly before the image has a chance to build-up an unambiguous signal. This deficiency can be partially remedied by increasing the number of axes, but at the price of reducing the simplicity of the linear comb-array approach.

Accordingly, there is a need for a signal processor or signal processing circuit and method that is capable of tracking motion from an optical sensor without requiring the generation and processing of quasi-sinusoidal signals for tracking, thereby providing motion tracking from a single processing path with much simpler signal processing requirements. It is desirable that the signal processing circuit and method are capable of tracking motion from a comb-array having an arbitrary M value. It is still further desirable that the circuit and method can be applied to both speckle and non-speckle based devices, and to devices or optical sensors having either 1D or 2D arrays.

BRIEF DESCRIPTION OF THE DRAWINGS

These and various other features and advantages of the present invention can be understood more fully from the detailed description that follows and from the accompanying drawings, which however, should not be taken to limit the appended claims to the specific embodiments shown, but are for explanation and understanding only, where:

Figures 12A, 12B:
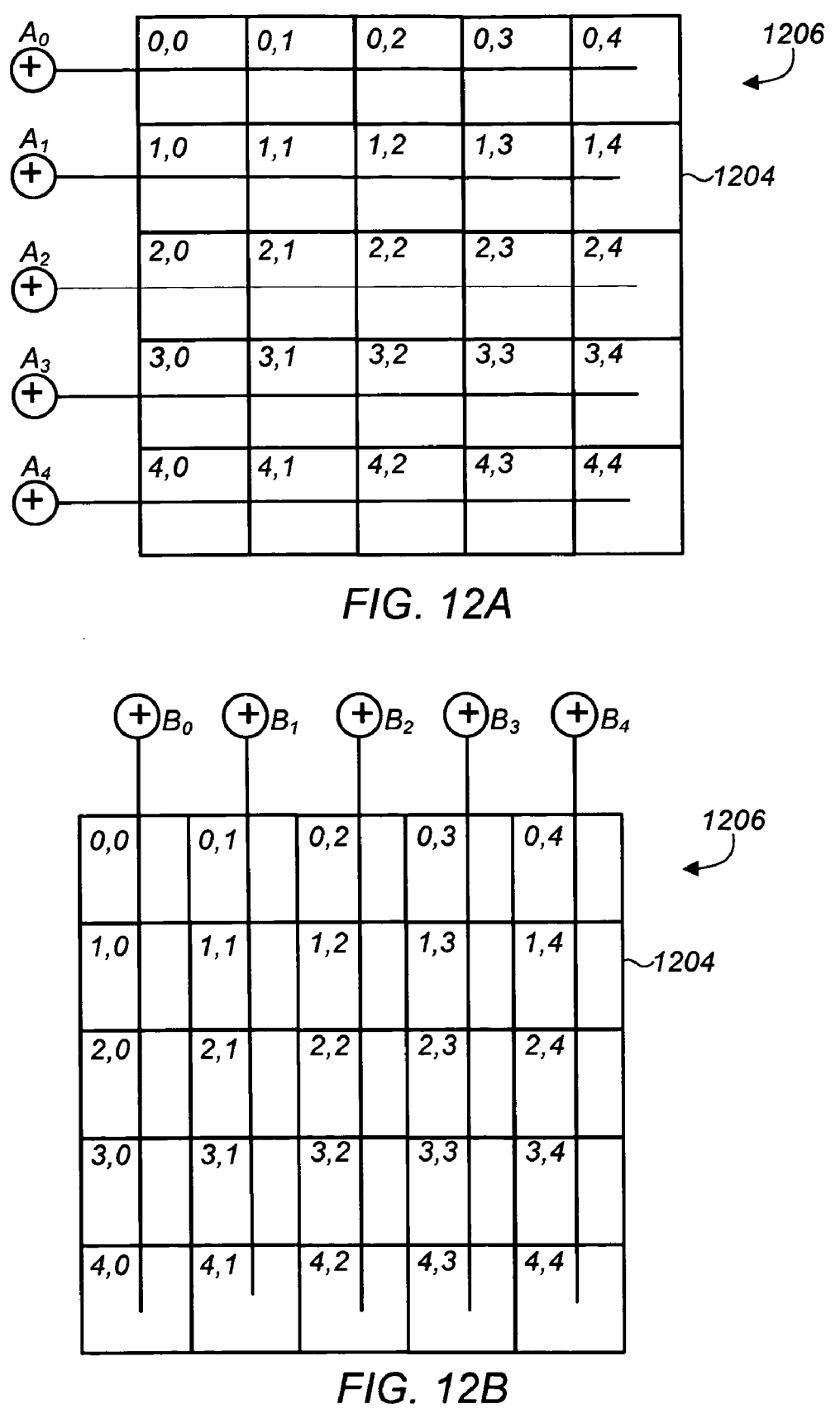

FIGS. 12A through 12D are schematic block diagrams of various embodiments for grouping photosensitive elements in a two-dimensional comb-array according to the present invention.

DETAILED DESCRIPTION

Figure 1:
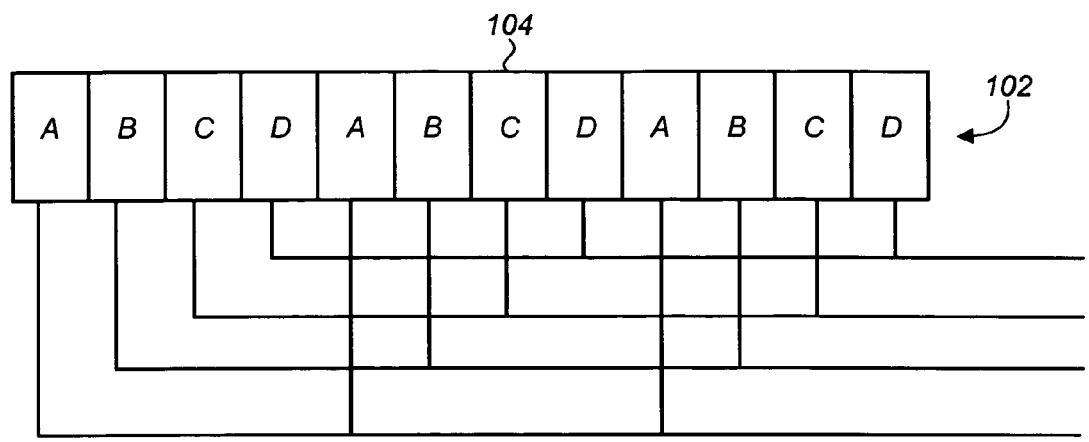
FIG. 1 (prior art) is a schematic block diagram of a linear, one-dimensional (1D) comb-array having a number of photodiodes in which every fourth photosensitive element is coupled together to provide an M value of 4.

The present invention is directed to signal processors or signal processing circuits and methods, and more particularly for use in optical navigation systems with comb detector arrays to determine motion of the system relative to a surface without the use of sinusoidal signals.

Optical navigation systems can include, for example, an optical computer mouse, trackballs and the like, and are well known for inputting data into and interfacing with personal computers and workstations. For purposes of clarity, many of the details of optical navigation systems in general and optical sensors for optical navigation systems in particular that are widely known and are not relevant to the present invention have been omitted from the following description. Optical navigation systems and optical sensors are described, for example, in co-pending, commonly assigned U.S. patent application Ser. No. 11/129,967, entitled, "Optical Positioning Device Having Shaped Illumination," filed on May 16, 2005 by Clinton B. Carlisle et al., and incorporated herein by reference in its entirety.

In the following description, for purposes of explanation, numerous specific details are set forth in order to provide a thorough understanding of the present invention. It will be evident, however, to one skilled in the art that the present invention may be practiced without these specific details. In other instances, well-known structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the invention. The appearances of the phrase "one embodiment" in various places in the specification do not necessarily all refer to the same embodiment. The term "to couple" as used herein may include both to directly connect and to indirectly connect through one or more intervening components.

Briefly, the signal processing circuits and method of the present invention involves detecting and measuring changes in phase of a strong spatial frequency of a signal captured by an optical sensor as it is moved relative to a surface over which it is positioned. Information on the magnitude and direction of displacement of the sensor relative to the surface may then be determined using any of a number of signal processing methods to process the phase change information. Preferably, the strong spatial frequency of a signal matches a period of the sensor. More preferably, the optical sensor is a speckle-based sensor, which senses movement based on displacement of a complex intensity distribution pattern of light, known as speckle. Speckle is essentially the complex interference pattern generated by scattering of coherent light off of a rough surface and detected by a photosensitive element, such as a photodiode, with a finite angular field-of-view (or numerical aperture). However, it will be appreciated by those skilled in the art that the method and circuit of the present invention is not limited to speckle-based sensors, and can be used with other types of illumination, including coherent and non-coherent light sources, and images having the signal captured by the optical sensor with a strong spatial frequency matching a period of the sensor.

Optical Navigation System

Figure 2:
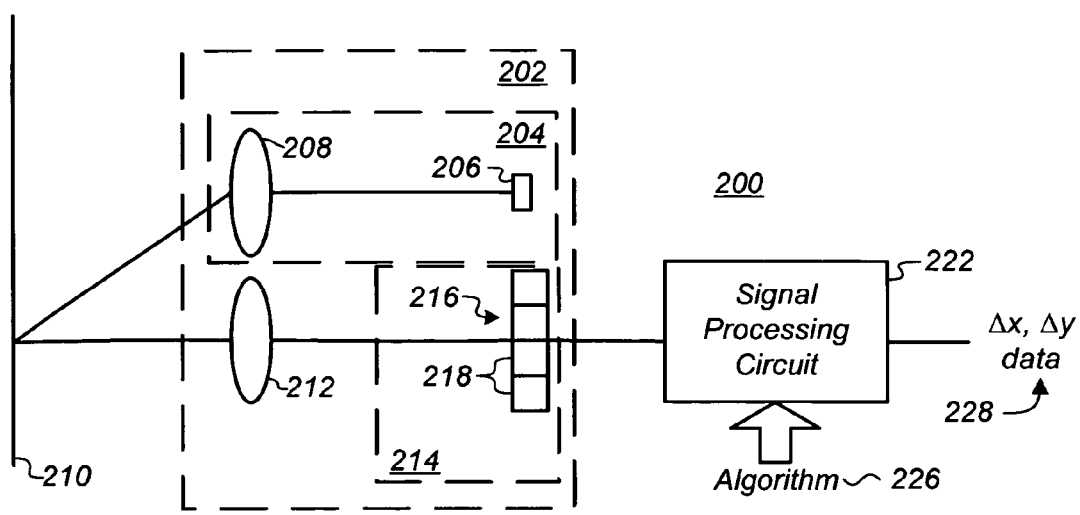
FIG. 2 is a functional block diagram of an optical navigation system having a signal processing circuit for processing signals according to an embodiment of the method of the present invention.

A functional block diagram of one embodiment of an optical navigation system for which the signal processing method of the present invention is particularly useful is shown in FIG. 2. Referring to FIG. 2, an optical navigation system 200 generally includes an optical head 202 having an illuminator 204 with a light source 206 and illumination optics 208 to illuminate a portion of a surface 210, imaging optics 212 to map or image a pattern of the by the surface, and an optical sensor 214 to sense or detect change in the pattern. The optical sensor 214 includes one or more one-dimensional (1D) or two-dimensional (2D) arrays 216 each having a number of photosensitive elements, such as photodiodes 218, on which light reflected from the surface 210 is received. The array(s) 216 may be configured to provide displacement measurements along two orthogonal axes, x and y. The optical navigation system 200 further includes signal processing circuitry 222 for processing signals from the array(s) 216 in accordance with the method of the present invention. Groups of photodiodes 218 in the array(s) 216 may be combined or wire summed to produce group signals. These group signals are subsequently processed by the signal processing circuitry 222 using an algorithm 226 to produce $\Delta x$, $\Delta y$ data 228 providing information on the magnitude and direction of displacement of the optical head 202 in x and y directions.

A Linear or 1D Comb-Array

It is instructive to be familiar with a linear, 1D comb-array for understanding the signal processing method of the present invention. Although, described in detail with reference to a 1D comb-array having an M value or period of five (5), it will be appreciated that the method of the present invention is also applicable to 1D and 2D arrays having different configurations or arrangement of photosensitive elements. For example, the method is applicable to 1D comb-arrays wired together to provide M value spanning of from about three (3) to about (10) elements, and in particular to those have M values or periods of 4, 6 and 8, without departing from the scope of the present invention.

Figure 3:
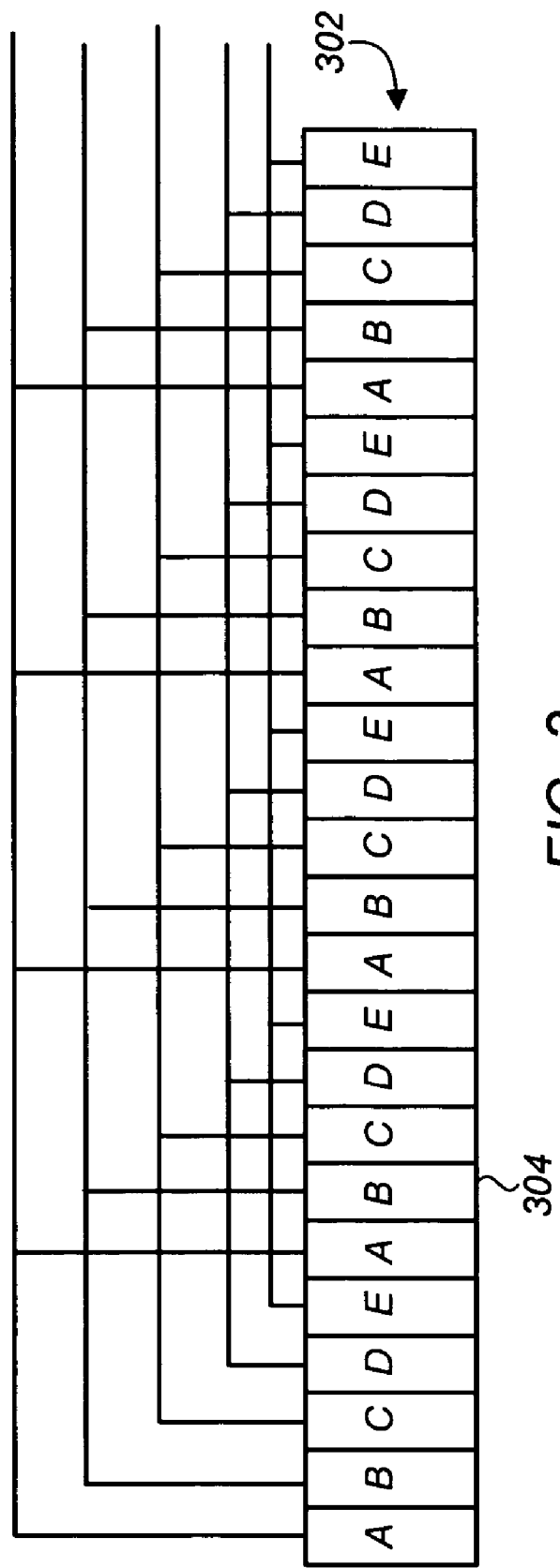
FIG. 3 is a schematic block diagram of a linear, 1D comb-array having an M value of 5 for which a signal processing method according to the present invention is useful.

FIG. 3 shows a general configuration (along one axis) of a 1D comb-array 302 of photosensitive elements, such as photodiodes 304, wherein the combination of interlaced groups of photosensitive elements serves as a periodic filter on spatial frequencies of light-dark signals 306 produced by the speckle (or non-speckle) images mapped to the array. In the embodiment shown, the 1D comb-array 302 consists of a number of photodiode sets or periods 308, each having five of photodiodes 304, labeled here as A, B, C, D, and E. Currents or signals from corresponding or similarly labeled photodiodes 304 in each period are electrically connected (wired sum) to form five line or group signals 310 coming out from the array 302. The group signals 308 that are subsequently processed by signal processing circuitry (not shown in this figure) using the inventive method to detect and measure changes in phase of a strong spatial frequency of a signal captured by the 1D comb-array 302 as it is moved relative to a surface over which it is positioned. Information on the magnitude and direction of displacement of the 1D comb-array 302 relative to the surface may then be determined using the phase change information by any of a number of signal processing methods Preferably, the width of the photodiode sets or periods 308 is matched to the average period of the light-dark signals 306 to filter a desired signal arising from light originating with the light source and reflected from the surface. By matched it is meant, that an average diameter of the speckle or light-dark pattern mapped or imaged to the 1D comb-array 302 is corresponds to the photodiodes 304 width such that the diameter of one light and one dark spot is substantially equal to the M value of the array, or the sum of the widths of photodiodes in a period 308.

More preferably, the 1D comb-array 302 is one of multiple 1D comb-arrays in an optical sensor in which two or more 1D arrays are arranged along non-parallel axes to measure two-dimensional displacement. Exemplary embodiments of various sensor arrays having multiple one-dimensional 1D arrays arranged along multiple axes to measure two-dimensional displacement are shown in FIGS. 6 through 9, and described in greater detail below.

Weighted Phase Detection

Figure 4:
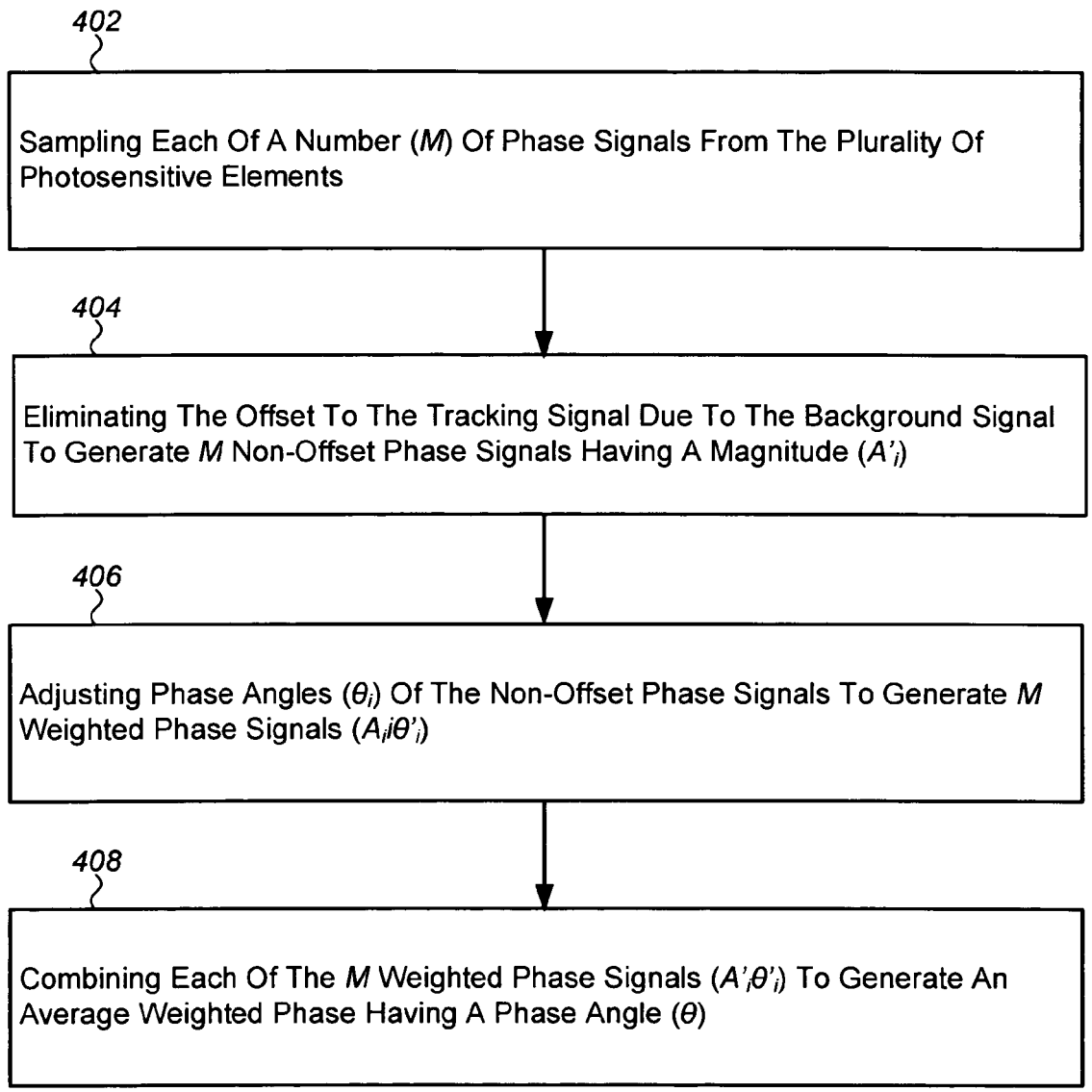
FIG. 4 is a flowchart of a signal processing method according to an embodiment of the present invention.

A method of signal processing method according to an embodiment of the present invention will now be described with reference to the flowchart of FIG. 4. Referring to FIG. 4, the method begins with sampling each of a number (M) of phase signals from the plurality of photosensitive elements (step 402). Each of the M signals has a magnitude ($A_i$) and includes a tracking signal at a frequency being tracked and a background signal at other frequencies that offsets the tracking signal, where i, an index of the signals, is a whole number between 0 and M-1. Next, the offset to the tracking signal due to the background signal is eliminated to generate M non-offset phase signals having a magnitude ($A'_i$) (step 404). The phase angles ($\theta_i$) of the non-offset phase signals are then adjusted to generate M weighted phase signals ($A'_i\theta'_i$) (step 406). Finally, each of the M weighted phase signals ($A'_i\theta'_i$) are combined to generate an average weighted phase having a phase angle ($\theta$) (step 408). When tracked over time the average weighted phase signal indicates a direction and velocity of the movement of an image of the surface mapped to the array.

Figure 5:
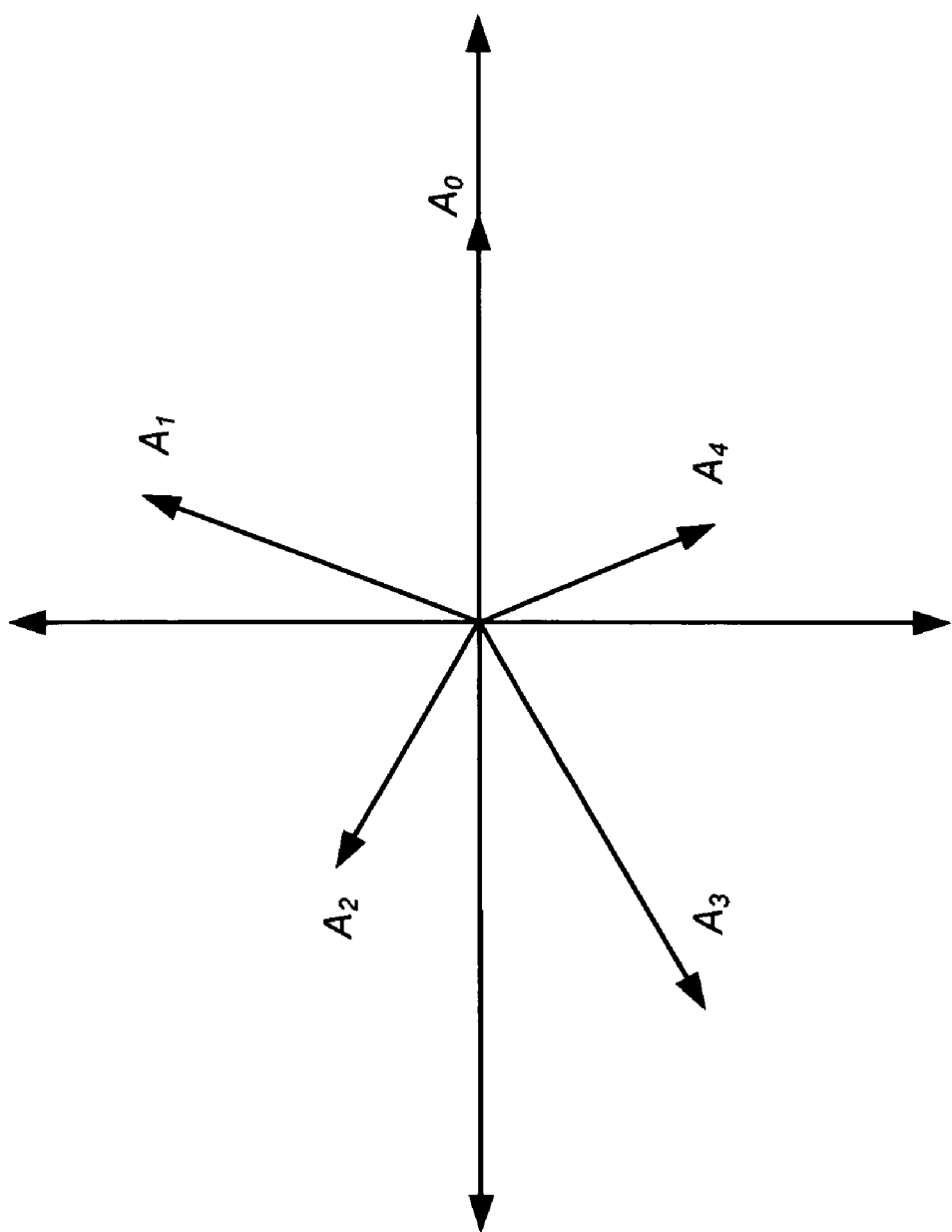
FIG. 5 is a vector diagram or phase plot representing the signal strength of a number of signals from a 1D comb-array in each of M phases (M=5) according to an embodiment of the method of the present invention.

A signal processing method according to one preferred embodiment of the present invention will now be described in greater detail with reference to FIGS. 3 and 5. FIG. 3, described above, is a schematic block diagram of a linear, 1D comb-array having an M value of 5, and for which a signal processing method according to the present invention is useful. FIG. 5 is a vector diagram or phase plot representing the signal strength of a number of signals from a 1D comb-array having an M value of 5.

Referring to FIG. 5, the outputs of the comb-array 302 shown in FIG. 3 can be seen as representing the strength of the signal in each of M phases ($A_i$). Each of these M phases is evenly distributed around a phase plot at an angle of $\theta_i$. A mathematical expression of this distribution is shown in Eq. 1.0, where i is the index and angle $\phi$ represents an arbitrary angular offset indicating that the exact alignment of each of the phases is unimportant, only that they are evenly distributed.

$$\theta_{i=0 \to M-1} = \varphi + \frac{2\pi}{M} i \qquad \text{(Eq. 1.0)}$$

Due to the nature of the comb-array each of the M phases coming out of the array contains two significant components: the signal at the spatial frequency that is being tracked (tracking signal), and the combined contribution of all the signals not at the frequency of interest and any ambient light (background signal). The spatially-filtering nature of the comb-array cause the background signals to be spread out relatively uniformly across all M signals and produce an effective offset to the tracking signal. Thus, the first step in processing the combined signal is to eliminate as much of this offset as possible. In one embodiment of the method of the invention this is accomplished by finding and subtracting out the lowest signal level or lowest signal strength of the M signals ($A_{min}$). This results in M new signals referred to as $A'_i$:

$$A'_i = A_i - A_{min} \qquad \text{(Eq. 2.0)}$$

The phase angles described above produce a large discontinuity between $\theta_0$ and $\theta_M$ as the value wraps. This discontinuity leads to difficulties in calculating the phase of the current signal. In order to minimize the effect of this discontinuity it is desirable to locate the discontinuity around the $A_{min}$ signal. This is accomplished by subtracting one rotation, i.e., $2\pi$, 360°, etc., from all $\theta_i$, where $i > i_{Amin}$. In the case where $A_{min}$ is $A_0$, it makes no difference if this flipping is carried out or not. An example of the resulting phase angles where M=5 for all possible $A_{min}$ is given in Table I below.

TABLE I

| If $A_{min}$ is at: | $\theta_0$ | $\theta_1$ | $\theta_2$ | $\theta_3$ | $\theta_4$ |
|---|---|---|---|---|---|
| $A_0$ | 0 | 72 | 144 | 216 | 288 |
| $A_1$ | 0 | 72 | −216 | −144 | −72 |
| $A_2$ | 0 | 72 | 144 | −144 | −72 |
| $A_3$ | 0 | 72 | 144 | 216 | −72 |
| $A_4$ | 0 | 72 | 144 | 216 | 288 |

Next, the $A'_i$ signals are combined with the adjusted $\theta_i$ to produce a weighted average of the phases:

$$\theta = \frac{\sum_{i=0}^{M-1} A'_i \theta_i}{\sum_{i=0}^{M-1} A'_i} \quad \text{(Eq. 3.0)}$$

The weighted average of the phases, θ, results in a phase angle that, when tracked over time, indicates the direction and velocity of the movement of the surface image across the optical sensor or array. (Note that the value of $\theta_{A\min}$ makes no contribution as $A'_{min}$ will always be 0.) By combining the outputs of multiple photosensitive elements in each linear, 1D comb-array and multiple 1D comb-arrays arranged along non-parallel axes, a composite optical sensor can be constructed to track arbitrary motion in two-dimensions.

In another embodiment of the method of the present invention, the largest magnitude signal is determined and subtracted to eliminate the offset caused by the background signal. In this embodiment, the resulting difference in the calculated phase is ½ of the rotation or 180° different from that calculated with the minimum signal. This has no effect on the ability to track motion. The calculated phase from the maximum and the minimum should have a difference of ½ rotation when reliable signals are present. If the difference varies from ½ rotation, it is an indicator that one or more of the signals may be problematic. One example would be a situation where noise results in two minima or two maxima.

In yet another embodiment the phase is calculated based on both the maximum and minimum, adjust one by ½ rotation, and the resulting phases averaged, thereby providing improved tracking performance.

Signal Contrast Measurement

In addition to providing the weighting factors for each of the phases, the signals, for example $A_0$ to $A_4$ above, can also be used to measure the contrast of the image seen by the optical sensor or array. This is accomplished by summing of the signals as shown in equation 4.0 below.

$$C = \sum_{i=0}^{M-1} A'_i \quad \text{(Eq. 4.0)}$$

The resulting measurement, C, serves two important functions. First, when the contrast drops below a certain threshold, the phase measurement may become unreliable. In a system using speckle-based illumination and having multiple linear comb-arrays per axis each with a different M value, it is common for any one array to receive a low contrast image for a short period due to the random nature of the speckle signal. It is rare however for more than one linear comb-array to receive such a low contrast signal at the same time. This enables the contrast measurement to be used to indicate when the phase measurement of one comb-array should be ignored and the remaining comb-arrays used. Secondly, the contrast of a speckle signal is usually closely related to the laser power directed at the surface being imaged. Since the contrast measurement concentrates on the signal of interest and excludes other signals and ambient light, it can be used to drive an automatic gain control circuit to control the power output of the laser source. A very high contrast indicates that the laser power can be reduced while still maintaining acceptable tracking. A low contrast indicates that power output should be increased to maintain tracking.

Once again if the maximum is used to calculate the A' signals the effect is the same with the exception that C will be a negative value. In either case it is the magnitude regardless of sign that should be taken as a measurement of contrast.

Exemplary Signal Processing Circuit

Figure 6:
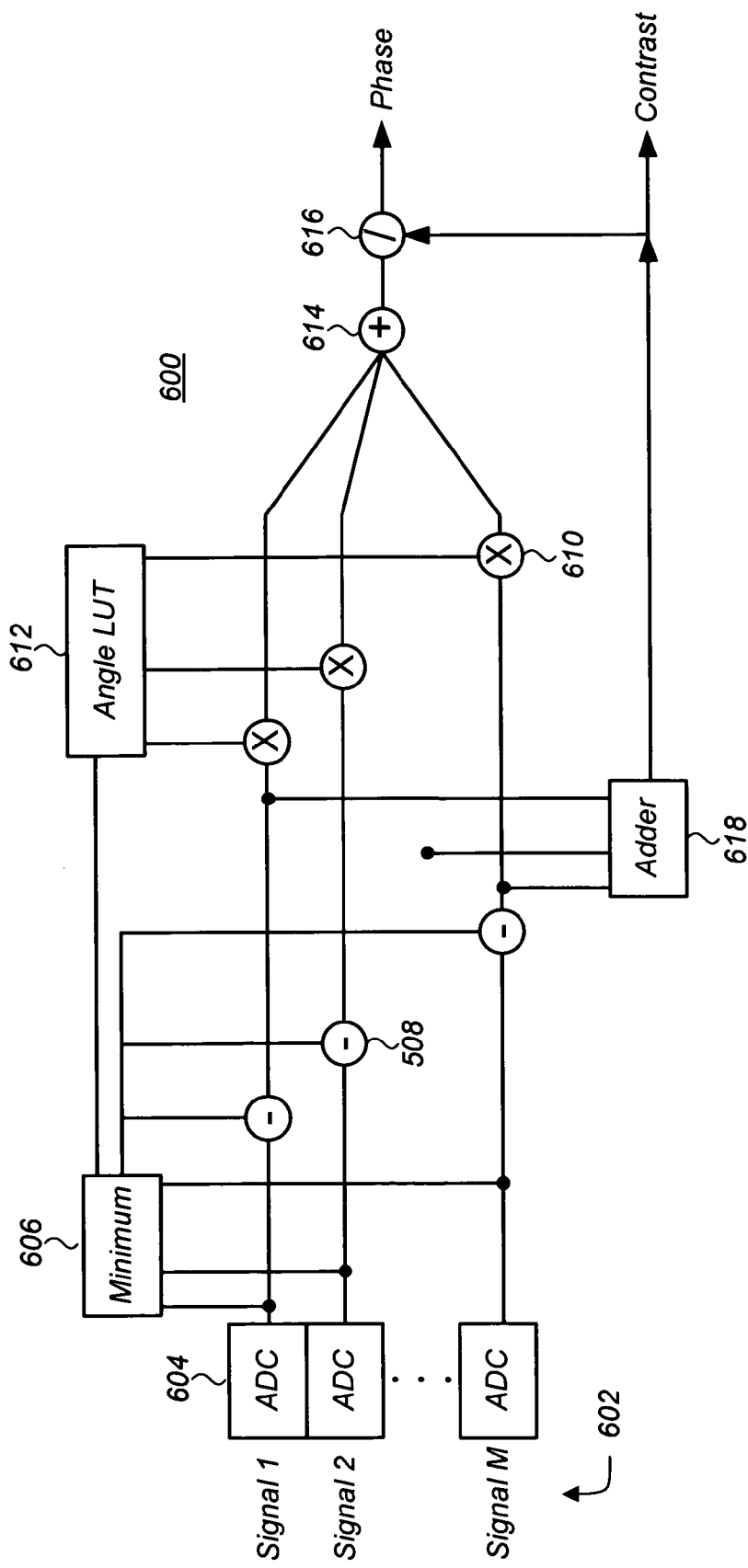
FIG. 6 is a block diagram of a signal processing circuit according to an embodiment of the present invention.
Figure 7:
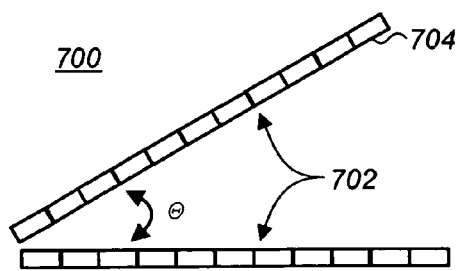
FIGS. 7 through 10 are schematic block diagrams of various embodiments of sensor arrays having multiple one-dimensional 1D arrays arranged along multiple axes for which a signal processing circuit and method according to the present invention are particularly useful.

An embodiment of a signal processing circuit 600 for executing the above method is illustrated in FIG. 5 in a block diagram form. Referring to FIG. 6, a number of line or group phase signals 602 (shown here as signals 1 through M) from a sensor array (not shown) are converted from analog to digital values in multiple analog to digital converters (ADC) 604. A minimum phase signal is determined or identified from among the number of phase signals 602 using a minimum detection circuitry 606, and the identified minimum phase signal is subtracted from the remaining phase signals in multiple subtractors 608. The resultant post subtraction phase signals are multiplied in multipliers 610 by a predetermined angle value ($\theta_i$) supplied from an angle look-up-table (LUT) 612, such as that shown in Table I above, to generate post subtraction weighted phase signals. These weighted phase signals are summed in an adder or summer 614 and divided in a divider 616 by a sum of the post subtraction unweighted phase signals supplied from adder 618 to provide a phase angle value. Optionally, the sum of the post subtraction unweighted phase signals may also be output to provide a contrast measurement of the image that can be used as an indication of the reliability of the phase measurement and/or to control power to the illuminator.

Exemplary Optical Sensors or Arrays

Although described in detail with reference to a linear, 1D comb-array of complementary metal-oxide semiconductor (CMOS) photodiodes, it will be understood that the method of the present invention is not limited to any one particularly type of photosensitive elements, i.e., CMOS photodiodes, but can be applied equally well to any type of photosensitive elements including a CMOS photo-detector, charge-coupled-device (CCD), etc. It will also be understood that the method of the present invention is not limited to any one particularly configuration or type of array i.e., a linear, 1D comb-array, but can be applied equally well to many types of arrays of photosensitive elements including a periodic, 2D comb-array, which includes a number of regularly spaced photosensitive elements having 1D or 2D periodicity, a quasi-periodic 2D array (such as a Penrose tiling), and a non-periodic 1D or 2D array, which have a regular pattern but do not include periodicities. By a 2D comb-array it is meant a planar array of a number of regularly spaced and electrically connected photosensitive elements extending substantially in at least two non-parallel directions, and having periodicity in two dimensions.

Exemplary embodiments of detector arrays for which a signal processing method according to an embodiment of the present invention is particularly useful will now be described with reference to FIGS. through 10, and FIGS. 11A and 11B.

In one preferred embodiment, an optical sensor for a speckle-based optical navigation system would include at least two linear or 1D arrays having non-parallel axes which cross to form an angle θ. More preferably, the optical sensor includes two or more linear arrays per axis or two or more parallel rows of photosensitive elements per linear array on each axis. In its simplest form, shown in FIG. 7, the optical sensor 700 has two 1D linear arrays 702 of interlaced groups of photosensitive elements 704 arranged along axes that cross to form an angle θ, where θ of 90° or less.

Figure 8:
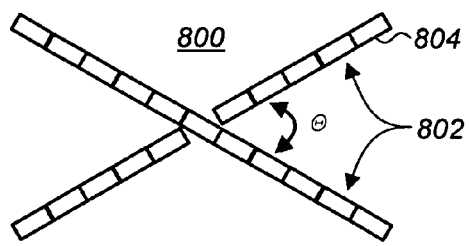

In one version of this embodiment, shown in FIG. 8, not only the axes of the optical sensor 800 cross, but the 1D linear arrays 802 of photosensitive elements 804 themselves cross to form an 'X' shaped sensor. In another alternative of this embodiment, not shown, the optical sensor can include two or more separate, independent linear arrays longitudinally spaced apart along each axis, or two or more separate, independent linear arrays spaced apart along parallel axes to form an 'X' shaped sensor array. In yet another alternative embodiment, not shown, two linear arrays can cross at an acute angle, sharing one or more photosensitive elements to form an 'X' shaped sensor array.

Figure 9:
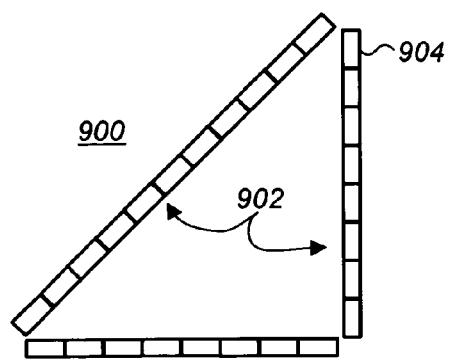

In still another version of this embodiment, shown in FIG. 9, the optical sensor 900 includes at least three linear arrays 902 of photosensitive elements 904 having non-parallel axes that cross to form a triangular shaped sensor. Optionally, as shown in FIG. 9, the sensor 1000 includes three linear arrays 1002 of photosensitive elements 1004 having non-parallel axes arranged to form a sensor having an equiangular triangular shaped sensor. It will be appreciated that the triangle need not be 'equilateral' since it is not necessary for all axes to have the same length. One advantage of a triangle configuration of axes is that the maximum off-axis angle of motion for the best two axes is minimized relative to other configurations of three axes.

Figure 10:
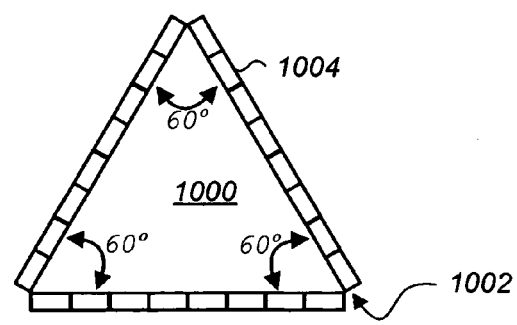
Figures 11A, 11B:
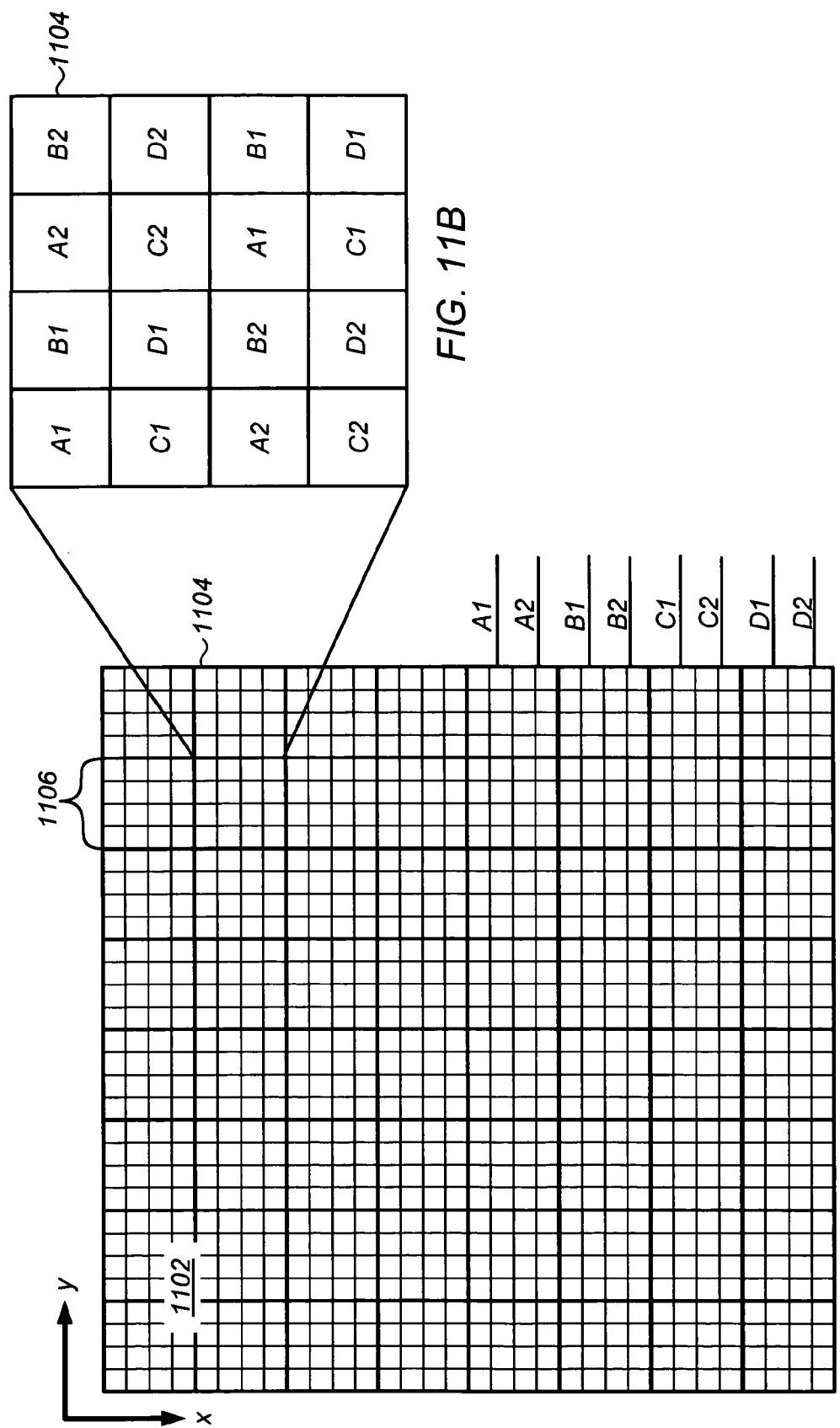
FIGS. 11A and 11B are schematic block diagrams of a two-dimensional comb-array for which a signal processing circuit and method according to the present invention are particularly useful.
Figure 12C:
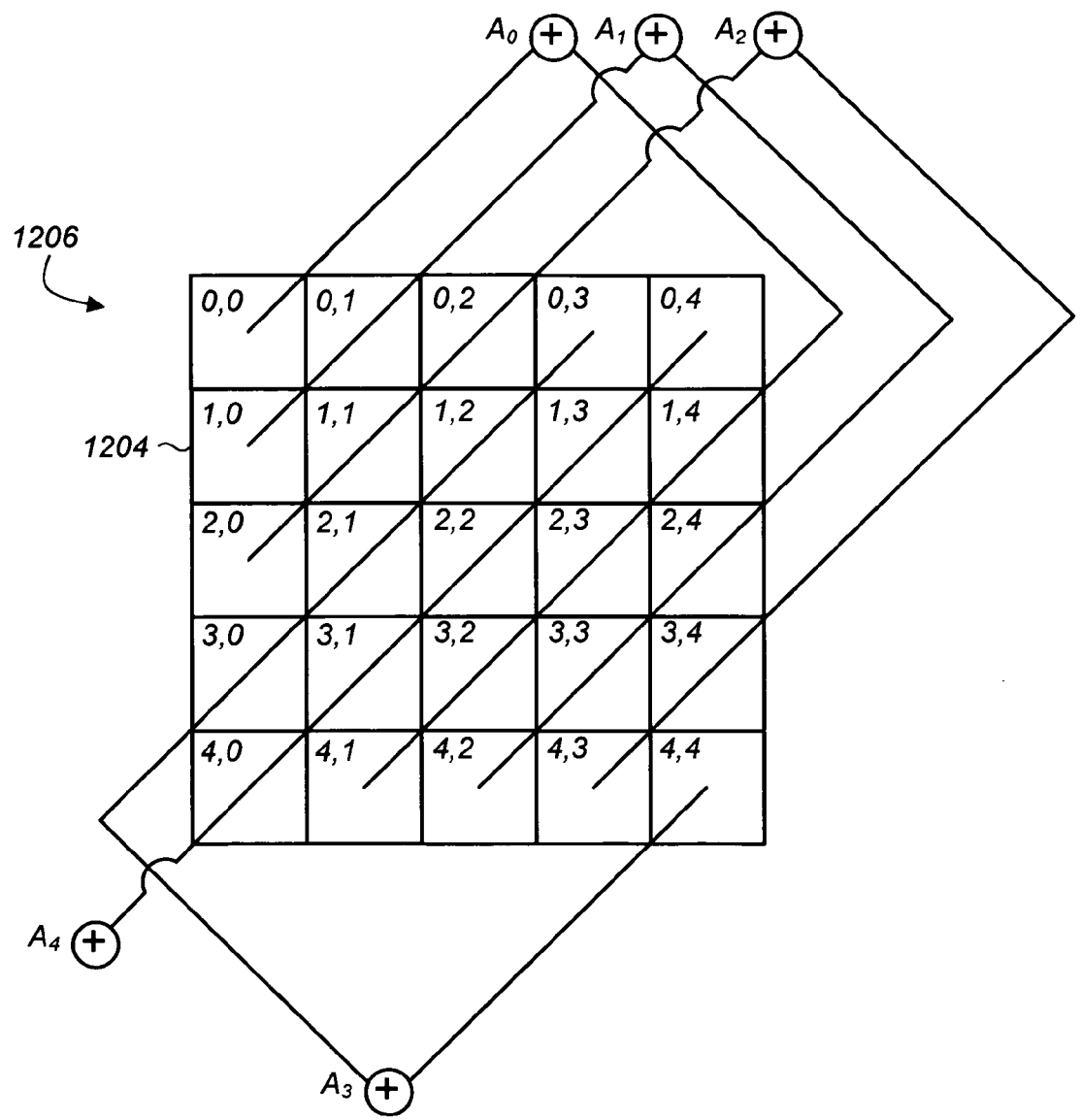
Figure 12D:
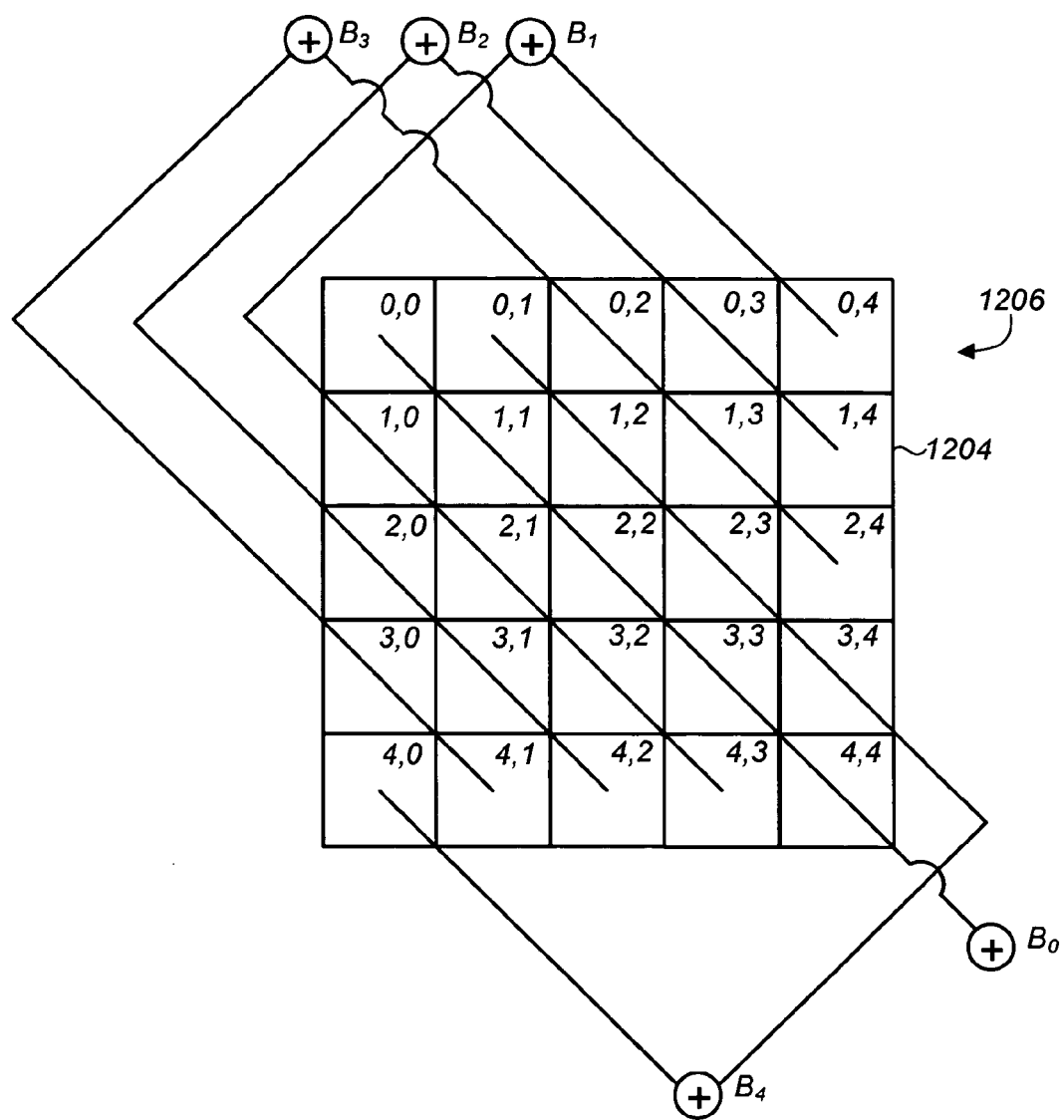

In another embodiment, shown in FIGS. 11A and 11B, the optical sensor can include a 2D comb-array 1102 having multiple photosensitive elements 1104 arranged or grouped into cells 1106, each cell having photosensitive elements grouped in a 4×4 elements-per-cell (or 4×4 elements/period) configuration. Photosensitive elements 1104 within a cell 1106 with the same letter and same number, as shown in the detail of FIG. 10B, as well as corresponding elements of all cells in the 2D comb-array 1102 with the same number, are electrically connected or wired-sum to yield eight group signals A1 through D2.

The eight wired-sum signals are further combined or processed using a method of the present invention similar to that described above to detect and measure changes in phase of the signal from the array 1102, which may then be used to produce Δx, Δy data providing information on the magnitude and direction of displacement of the optical sensor in x and y directions.

Alternatively, photosensitive elements 1204 within a cell 1206 can be grouped along horizontal, vertical and/or diagonal axes as shown in FIGS. 12A through 12D. Signals from photosensitive elements 1204 grouped along parallel axes within the cell 1206 and the array can be combined and the resultant signals processed using a method similar to that described above. Although, shown only as a 2D comb-array having a period or M value of 5, it will be appreciated that other array configurations are possible, including M equal to 3, 4, 6, and 8, without departing from the scope of the invention.

The foregoing description of specific embodiments and examples of the invention have been presented for the purpose of illustration and description, and although the invention has been described and illustrated by certain of the preceding examples, it is not to be construed as being limited thereby. They are not intended to be exhaustive or to limit the invention to the precise forms disclosed, and many modifications, improvements and variations within the scope of the invention are possible in light of the above teaching. It is intended that the scope of the invention encompass the generic area as herein disclosed, and by the claims appended hereto and their equivalents.

What is claimed is:

1. A method for detecting movement of a surface relative to an optical sensor having an array including a plurality of photosensitive elements, the method comprising steps of:

sampling each of a number (M) of phase signals from the plurality of photosensitive elements, each of the M signals having a magnitude ($A_i$) and including a tracking signal at a frequency being tracked and a background signal at other frequencies that offsets the tracking signal, where i, an index of the signals, is a whole number between 0 and M-1;

eliminating the offset to the tracking signal due to the background signal to generate M non-offset phase signals having a magnitude ($A'_i$);

adjusting phase angles ($\theta_i$) of the non-offset phase signals to generate M weighted phase signals ($A'_i\theta'_i$); and combining each of the M weighted phase signals ($A'_i\theta'_i$) to generate an average weighted phase having a phase angle (θ), that when tracked over time indicates a direction and velocity of the movement of an image of the surface mapped to the array.

2. A method according to claim 1, wherein the array is a periodic array in which the plurality of photosensitive elements are regularly spaced having a periodicity matched to that of the frequency of the signal being tracked.

3. A method according to claim 2, wherein the step of eliminating the offset to the tracking signal due to the background signal comprises the steps of:

selecting a phase signal from among the M phase signals; and subtracting the selected phase signal from each of the remaining (M-1) phase signals to generate the M non-offset phase signals.

4. A method according to claim 3, wherein the step of selecting a phase signal from among the M phase signals comprises the step of identifying and selecting a minimum phase signal ($A_{min}$) having the lowest signal strength from among the M phase signals.

5. A method according to claim 4, wherein the step of adjusting phase angles ($\theta_i$) of the non-offset phase signals to generate M weighted phase signals ($A'_i\theta'_i$) comprises the step of multiplying each of the M non-offset phase signals post subtraction by predetermined angle values to generate M weighted phase signals ($A'_i\theta'_i$).

6. A method according to claim 5, wherein the step of multiplying each of the M non-offset phase signals by predetermined angle values comprises the step of looking up a predetermined angle value for each of the M non-offset phase signals in a look-up-table (LUT).

7. A method according to claim 3, wherein the step of combining each of the M weighted phase signals ($A'_i\theta'_i$) to generate an average weighted phase angle comprises the steps of:

summing values of the M weighted phase signals ($A'_i\theta'_i$); and dividing the sum of the M weighted phase signals ($A'_i\theta'_i$) by a sum of the M non-offset phase signals post subtraction to generate the average weighted phase angle.

8. A method according to claim 7, further comprising the step of measuring contrast of the image mapped to the array using the sum of the M non-offset phase signals post subtraction.

9. A method according to claim 8, wherein the optical sensor further comprises a light source to illuminate the surface, the light source adapted to cause at least some light reflected from the surface to be incident on the array; and wherein the method further comprises the step of controlling an amount of light output from the light source in response to the measured contrast of the image mapped to the array.

10. A method according to claim 9, wherein the optical sensor further comprises an Automatic Gain Control (AGC) circuit to amplify M phase signals from the plurality of photosensitive elements, and wherein the method further comprises the step of controlling the AGC circuit in response to the measured contrast of the image mapped to the array.

11. A signal processor for processing signals from an optical sensor having an array of a plurality of photosensitive elements to detect movement of a surface relative to the optical sensor, the signal processor comprising:

sampling means for sampling each of a number (M) of phase signals from the plurality of photosensitive elements, each of the M signals having a magnitude ($A_i$) and including a tracking signal at a frequency being tracked and a background signal at other frequencies, which offsets the tracking signal, where i, an index of the signals, is a whole number between 0 and M-1;

offset elimination means for eliminating the offset to the tracking signal due to the background signal to generate M non-offset phase signals having a magnitude ($A'_i$);

phase angle adjusting means for adjusting phase angles ($\theta_i$) of the non-offset phase signals to generate M weighted phase signals ($A'_i \theta'_i$); and combining means for combining each of the M weighted phase signals ($A'_i \theta'_i$) to generate an average weighted phase having a phase angle ($\theta$), that when tracked over time indicates the direction and velocity of the movement of an image of the surface mapped to the array.

12. A signal processor according to claim 11, wherein the offset elimination means comprises a circuit to identify from among the M phase signals a minimum phase signal ($A_{min}$) having the lowest signal strength, and to subtract $A_{min}$ from each of the remaining (M-1) phase signals to generate the M non-offset phase signals.

13. A signal processor according to claim 12, wherein the phase angle adjusting means comprises a circuit to multiply each of the M non-offset phase signals post subtraction by predetermined angle values to generate M weighted phase signals ($A'_i \theta'_i$).

14. A signal processor according to claim 13, wherein the combining means comprises:

a summing circuit to sum the values of the M weighted phase signals ($A'_i \theta'_i$); and a dividing circuit to divide the sum of the M weighted phase signals ($A'_i \theta'_i$) by a sum of the M non-offset phase signals post subtraction to generate the average weighted phase angle.

* * * * *